Inventor:
Christopher B. Knepper,

Patented Nov. 28, 1922.

1,436,882

UNITED STATES PATENT OFFICE.

CHRISTOPHER B. KNEPPER, OF AKRON, OHIO, ASSIGNOR TO MILLER RUBBER COMPANY, OF AKRON, OHIO, A CORPORATION OF OHIO.

QUICK-DETACHABLE PIPE CONNECTION.

Application filed August 24, 1920. Serial No. 405,631.

*To all whom it may concern:*

Be it known that I, CHRISTOPHER B. KNEPPER, a citizen of the United States, and resident of Akron, Ohio, have invented certain new and useful Improvements in Quick-Detachable Pipe Connections, of which the following is a specification.

My present invention relates to quick detachable pipe connections designed more especially for pipes such as are used to conduct the air to tires while they are being vulcanized.

As is well known to those skilled in the art, cord tires are usually cured in molds while subjected to internal pressure, which is usually maintained by having the air bag, upon which the tire is mounted, connected throughout the curing operation, with a source of air pressure. Great trouble has been experienced in the maintenance of the air pressure due to the means by which the pipe connections have heretofore been made to the air bags. These connections, if not air tight, will not only cause loss of the pressure fluid, but may result in so reduced a pressure as to result in the production of defective tires. Various forms of screw connections have heretofore been used which necessitate the use of wrenches for their removal, and it will be readily seen, that in a factory manufacturing many thousands of tires a day this results in a material loss of time in connecting and disconnecting the pipes, and further, by reason of the frequent operation, the threads become worn or damaged necessitating the substitution of new connections resulting in further loss of time and material expense.

The present invention aims to provide a simple form of detachable connection which may be manufactured at low cost, which will be of a durable nature, not likely to become worn or damaged through frequent use, which may be easily and quickly operated, and which will result in a joint or connection not likely to allow leakage of the pressure fluid.

With these and other objects in view the invention includes the novel features of construction and arrangement and combination of parts hereinafter described and particularly defined by the appended claims.

An embodiment of my invention is illustrated in the accompanying drawings in which—

Figure 1:
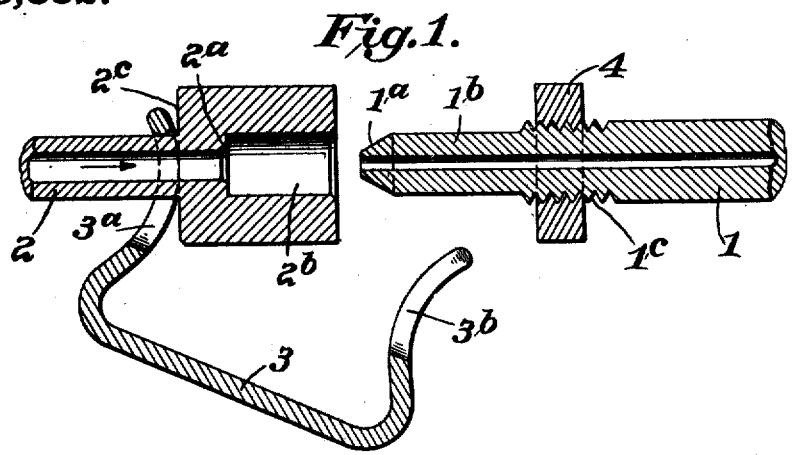
Figure 1 is a longitudinal sectional view of the male and female members of the coupling before being brought together.
Figure 2:
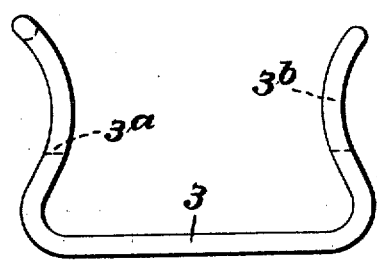
Figure 2 is a side elevation of the member for holding the said male and female members together.
Figure 4:
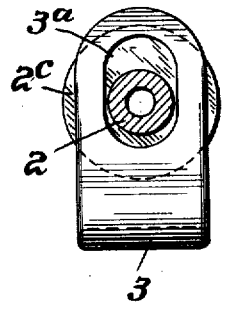
Figure 4 is a section on line 4—4 of Figure 3.
Figure 5:
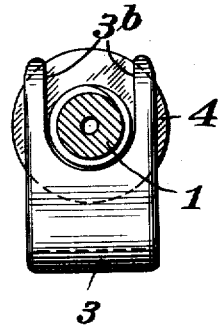
Figure 5 is a section on line 5—5 of Figure 3, looking in an opposite direction to that of Figure 4.
Figure 3:
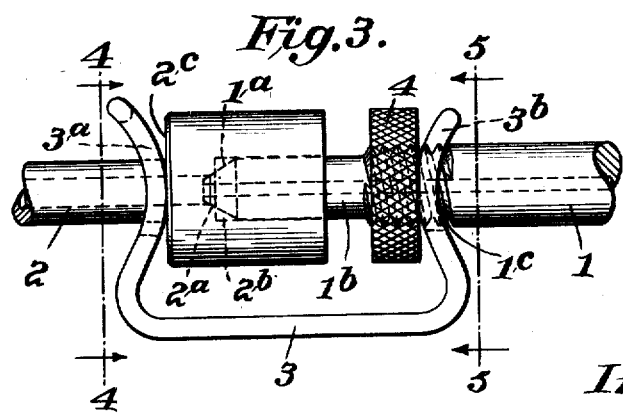
Figure 3 is a side elevation of the two coupling members as brought together and held by the retaining member.

Referring by reference characters to this drawing the numeral 1 designates a male coupling member and 2 a female coupling member, these being designed to be secured to the pipes or tubes to be connected in the ordinary or any desired manner. In practice the member 1 would preferably constitute the stem of the air bag used for inflating the tires and, except as hereinafter described, would be similar to the valve stem of the ordinary inner tube except that it would be unprovided with any valve. The male member 1 is provided with a cylindrical portion $1^b$ which fits slidingly or telescopes in a cylindrical recess $2^b$ in the female member. The end of this cylindrical portion $1^b$ of the male member is provided with a ground conical or tapered face $1^a$ which fits a correspondingly tapered seat $2^a$ of the female member. The male and female members are provided with shoulders or flanges designed to be engaged by a spring member for holding them pressed together with the ground face of the male member firmly seated against the corresponding portion of the female member. I prefer to make the flange or shoulder of one of the members adjustable, and in the form shown in the drawing accomplish this by threading the stem 1 as indicated at $1^c$ and screwing thereon a nut or collar as indicated at 4 the shoulder or flange of the other member being conveniently formed by the base of the enlarged portion of the coupling member as indicated at $2^c$. The member for holding these coupling members together is designated 3 and comprises a substantially broad U shaped spring metal clip. One of the arms is provided with an opening 3ᵃ of a size to receive the pipe or stem portion of the female coupling, and the other is provided with an open slot 3ᵇ, forming a forked portion as shown. The arms of the member 3 are rounded, curved, or flared in opposite directions. Before the male and female parts are brought together the coupling or compression member 3 will be held on the shank of the female member by the engagement of the latter in the opening 3ᵃ and the coupling member will drop down into the position shown in Figure 1. After the male and female members have been brought together the member 3 is swung up until the fork engages the rear face of the nut or collar 4 and as the member 3 is forced up into the position shown in Figure 3 the fork will bear on the collar 4 with a yielding cam action, and with the parts in the relation illustrated by Figure 3 the male and female members will be pressed together to effect an air tight joint.

At the same time the swinging of the member 3 in a reverse direction will enable the male and female members to be readily separated.

By adjusting the collar 4 the tension of the spring arms may be varied at will.

Having thus described my invention what I claim is—

1. A detachable pipe connection comprising cooperating male and female members having shoulders or flanges, a spring clip member for engaging said shoulders or flanges to hold the parts together, and means for varying the tension of the spring.

2. A detachable pipe connection comprising telescoping male and female members, one of said members having a rigid annular shoulder, a collar adjustable longitudinally of the other member and a spring clip or member for engaging said shoulder and collar.

In testimony whereof, I affix my signature.

CHRISTOPHER B. KNEPPER.